(12) United States Patent
Ceroll et al.

(10) Patent No.: US 6,810,780 B2
(45) Date of Patent: Nov. 2, 2004

(54) MITER DETENT OVERRIDE FOR A SLIDING COMPOUND MITER SAW

(75) Inventors: Warren A. Ceroll, Owings Mills, MD (US); James R. Parks, White Hall, MD (US); Thomas R. Kaye, Bel Air, MD (US); Steven A. Shull, Parkville, MD (US); Gregg L. Sheddy, Shrewsbury, PA (US); Brian P. Wattenbach, Columbia, MD (US)

(73) Assignee: Black & Decker Inc., Newark, DE (US)

(*) Notice: Subject to any disclaimer, the term of this patent is extended or adjusted under 35 U.S.C. 154(b) by 184 days.

(21) Appl. No.: 09/852,475

(22) Filed: May 10, 2001

(65) Prior Publication Data
US 2002/0166433 A1 Nov. 14, 2002

(51) Int. Cl.⁷ .............. B26D 1/14; B27B 5/00; B23D 33/02
(52) U.S. Cl. ............. 83/471.3; 83/473; 83/490
(58) Field of Search ................ 83/471.3, 473, 83/490

(56) References Cited

U.S. PATENT DOCUMENTS

| | | |
|---|---|---|
| 1,923,820 A | 8/1933 | Gorton |
| 2,666,367 A | 1/1954 | Berthiez |
| 3,487,863 A | 1/1970 | Buckley |
| 3,574,315 A | 4/1971 | Bouldinghouse |
| 3,611,953 A | 10/1971 | Schotti |
| 3,821,918 A | 7/1974 | Niehaus et al. |
| 3,948,136 A | 4/1976 | Gutowski et al. |
| 3,998,121 A | 12/1976 | Bennett |
| 4,011,782 A | 3/1977 | Clark et al. |
| 4,152,961 A | 5/1979 | Batson |
| 4,452,117 A | 6/1984 | Brickner et al. |
| 4,453,576 A | 6/1984 | Burns |
| 4,559,857 A | 12/1985 | Grossmann et al. |
| 4,665,782 A | 5/1987 | Vander Pol |
| 5,046,390 A | 9/1991 | Sasaki |
| 5,216,964 A | 6/1993 | Sato et al. |
| 5,249,496 A | 10/1993 | Hirsch et al. |
| 4,934,233 A | 8/1994 | Brundage et al. |
| 5,042,348 A | 8/1994 | Brundage et al. |
| 5,560,273 A | 10/1996 | Keddie |
| 5,595,124 A | 1/1997 | Wixey et al. |
| 5,819,624 A * | 10/1998 | Brault et al. .......... 83/471.3 |
| 5,907,987 A | 6/1999 | Stumpf et al. |
| 5,988,031 A | 11/1999 | Wixey |
| 6,016,732 A | 1/2000 | Brault et al. |
| 6,431,042 B1 * | 8/2002 | Brault et al. .......... 83/471.3 |
| 6,474,206 B1 * | 11/2002 | Brunson .............. 83/471.3 |
| 6,520,059 B1 * | 2/2003 | Stumpf et al. ......... 83/471.3 |
| 6,523,447 B2 * | 2/2003 | Judge ................. 83/471.3 |
| 6,658,977 B2 * | 12/2003 | Chang ................. 83/490 |

FOREIGN PATENT DOCUMENTS

| | | |
|---|---|---|
| DE | 130008 | 3/1978 |
| DE | 3120845 C3 | 11/1989 |
| DE | 4033037 C2 | 12/1992 |
| EP | 0091558 A2 | 10/1983 |
| EP | 0407205 B1 | 2/1995 |
| FR | 1.011.954 | 7/1952 |

* cited by examiner

Primary Examiner—Allan N. Shoap
Assistant Examiner—Jason Prone
(74) Attorney, Agent, or Firm—Harness, Dickey & Pierce, P.L.C.

(57) ABSTRACT

A compound miter saw includes a unique table assembly which incorporates a table locking mechanism and a detent override mechanism. The lock mechanism incorporated into the table assembly is movable between two positions. The first position locks the table to the miter saw and the second position permits rotation of the table. The detent override mechanism is normally engaged such that it will releasably hold the table in one of a plurality of popular miter angles. The detent override mechanism allows the operator to disengage the detent system to avoid the holding of the table during its rotation.

15 Claims, 8 Drawing Sheets

MITER DETENT OVERRIDE FOR A SLIDING COMPOUND MITER SAW

FIELD OF THE INVENTION

The present invention relates to compound miter saws or other power operated equipment or machinery utilizing a cutter for performing working operations on a workpiece. More particularly, the present invention relates to improvements in the table assembly for the miter adjustment for such power operated equipment. The table assembly includes a miter detent override for allowing adjustment of the miter angle without interference from the detent system.

BACKGROUND OF THE INVENTION

Saws and other apparatuses designed for cutting or performing other working operations on a workpiece typically require adjustment mechanisms for moving the saw blade or cutting tool into an angular relationship to the workpiece. An example of such equipment includes cross-cut compound miter saws which are adapted for allowing the user to selectively move the saw blade into any of a number of positions or modes for square cutting, miter cutting, bevel cutting, or compound miter cutting where a combination miter and bevel are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal or other materials.

In order to allow for the adjustment in miter and bevel angles, the saw blade, cutter or other working device is angularly adjustable with respect to a horizontal base and a vertical fence against which the workpiece is positioned. The miter adjustment allows the saw blade, cutter or other working device to move angularly with respect to the vertical fence while maintaining perpendicularity with the horizontal base. The bevel adjustment allows the saw blade, cutter or other working device to move angularly with respect to the horizontal base while maintaining perpendicularity with the vertical fence. At times it may be desirable to cut a combination miter and bevel by simultaneously adjusting the angularity of the blade with respect to both the horizontal base and the vertical fence.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device with respect to the base and fence while the cutting operation is performed. These locking mechanisms need to be easily activated, adjustable and quick acting in order to optimize the efficiency of the cutting apparatus and provide convenience to the operator of the apparatus.

SUMMARY OF THE INVENTION

In accordance with the present invention, an improved table assembly incorporating a miter locking mechanism with a miter detent override mechanism is employed. The locking mechanism includes an axially extending locking rod which has a two positional lever assembly at one end and a guide/locking bracket at the opposite end. The guide/locking bracket is utilized to guide the movement of the locking rod as well as to lock the table at the desired miter angle. The lever assembly is movable between a first position where the miter table is locked to a base of the table assembly at a specified position and a second position where the miter table is free to rotate with respect to the base of the table assembly. The miter detent override mechanism includes a detent spring, a detent spring actuator and a plurality of detent slots with each slot being located at one of the various popular miter angles. When the detent spring is located within one of the detent slots, the miter table is releasable held at a respective one of these popular miter angles.

The detent spring actuator is provided to cause the detent spring to bypass the various detent slots provided at the various popular miter angles, thus allowing for adjustment of the table to a position in between the miter detent slots.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
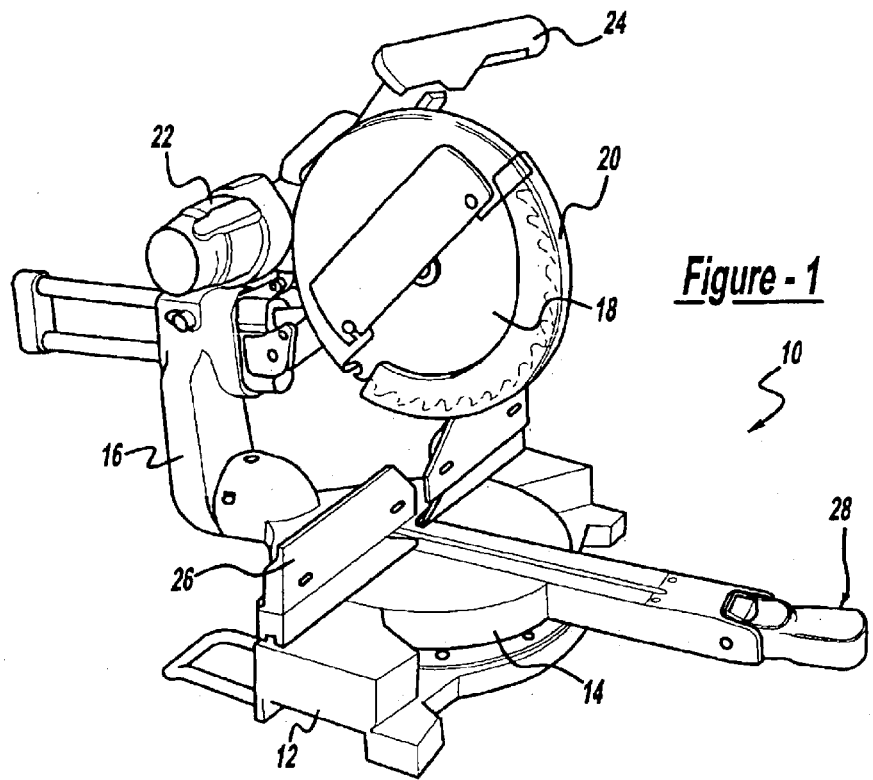
FIG. 1 is a front perspective view of a sliding compound miter saw in accordance with the present invention.
Figure 2:
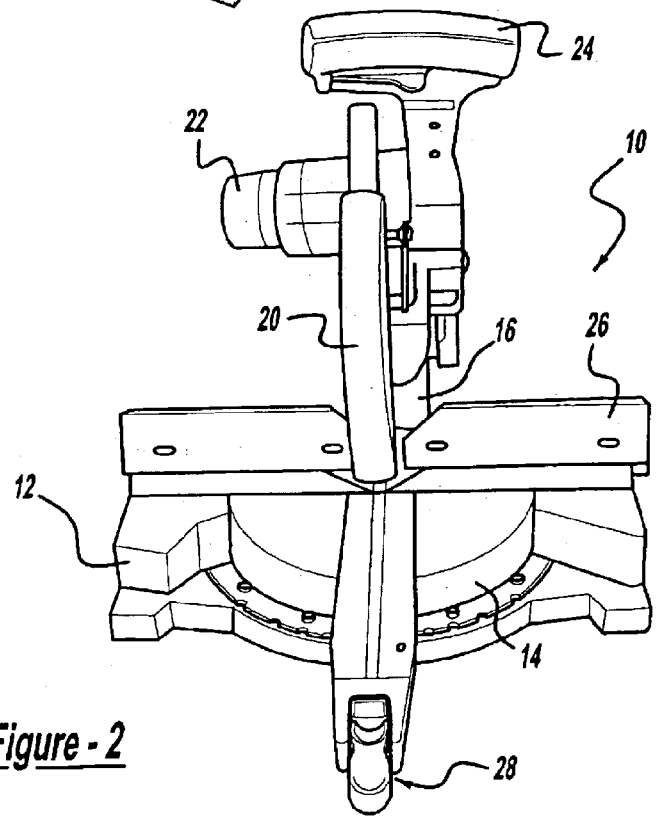
FIG. 2 is a front elevational view of the sliding compound miter saw shown in FIG. 1.
Figure 3:
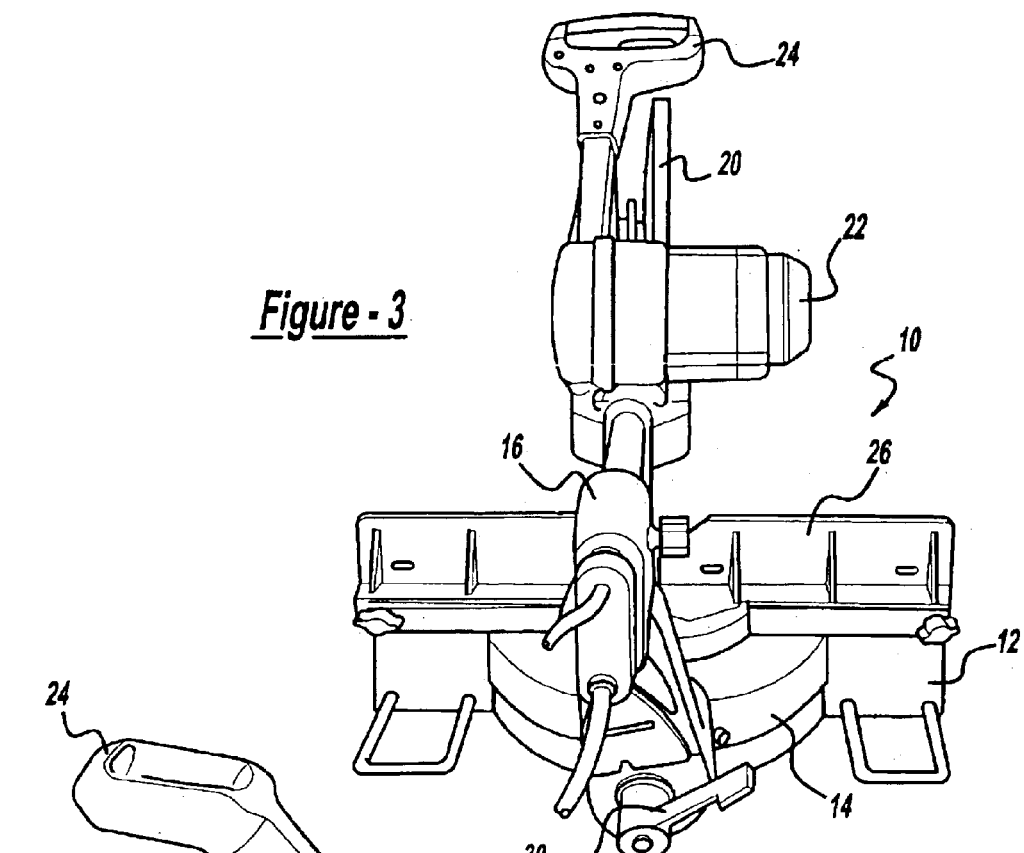
FIG. 3 is a rear elevational view of the sliding compound miter saw shown in FIGS. 1 and 2.
Figure 4:
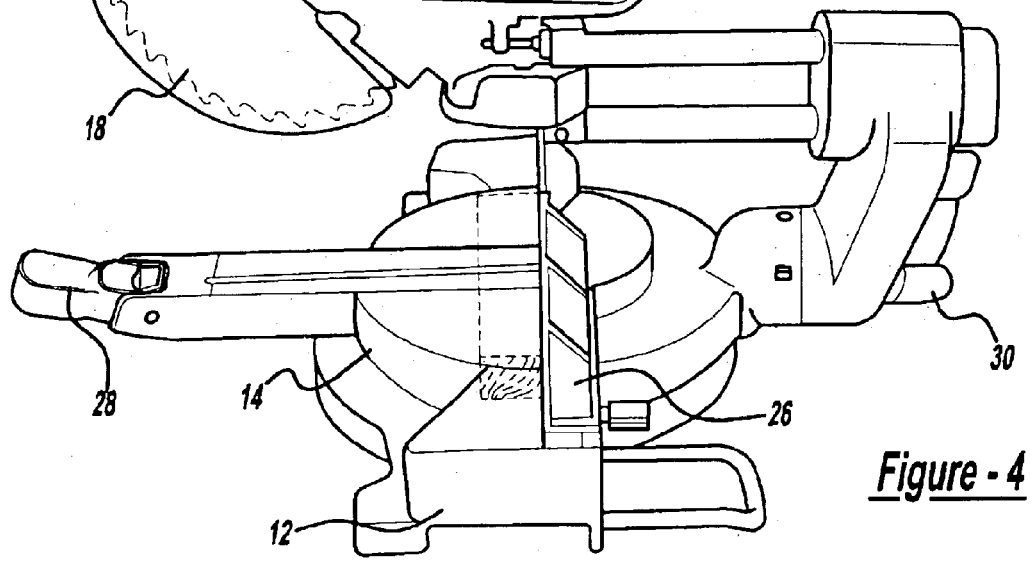
FIG. 4 is a side elevational view of the sliding compound miter saw shown in FIGS. 1 through 3.

The following description of the preferred embodiment(s) is merely exemplary in nature and is in no way intended to limit the invention, its application, or uses.

Referring now to the drawings in which like reference numerals designate like or corresponding parts throughout the several views, there is shown in FIGS. 1 through 4 an exemplary sliding compound miter saw incorporating a table assembly in accordance with the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws or other saws of types other than that shown for purposes of illustration in the drawings. Similarly, one skilled in the art will readily recognize that the principles of the table assembly according to the present invention are also applicable to other types of powered or unpowered equipment for performing an operation on a workpiece. Such equipment includes, but is not limited to, dado saws, spindle shapers or sanders, or other types of powered or unpowered devices that would benefit from the table assembly of the present invention.

Referring primarily to FIGS. 1 through 4, sliding compound miter saw 10 comprises a base assembly 12, a table assembly 14, a housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting as is known in the art. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with fence assembly 26. A locking mechanism 30 can be activated in order to lock housing assembly 16 to table assembly 14.

Figure 5:
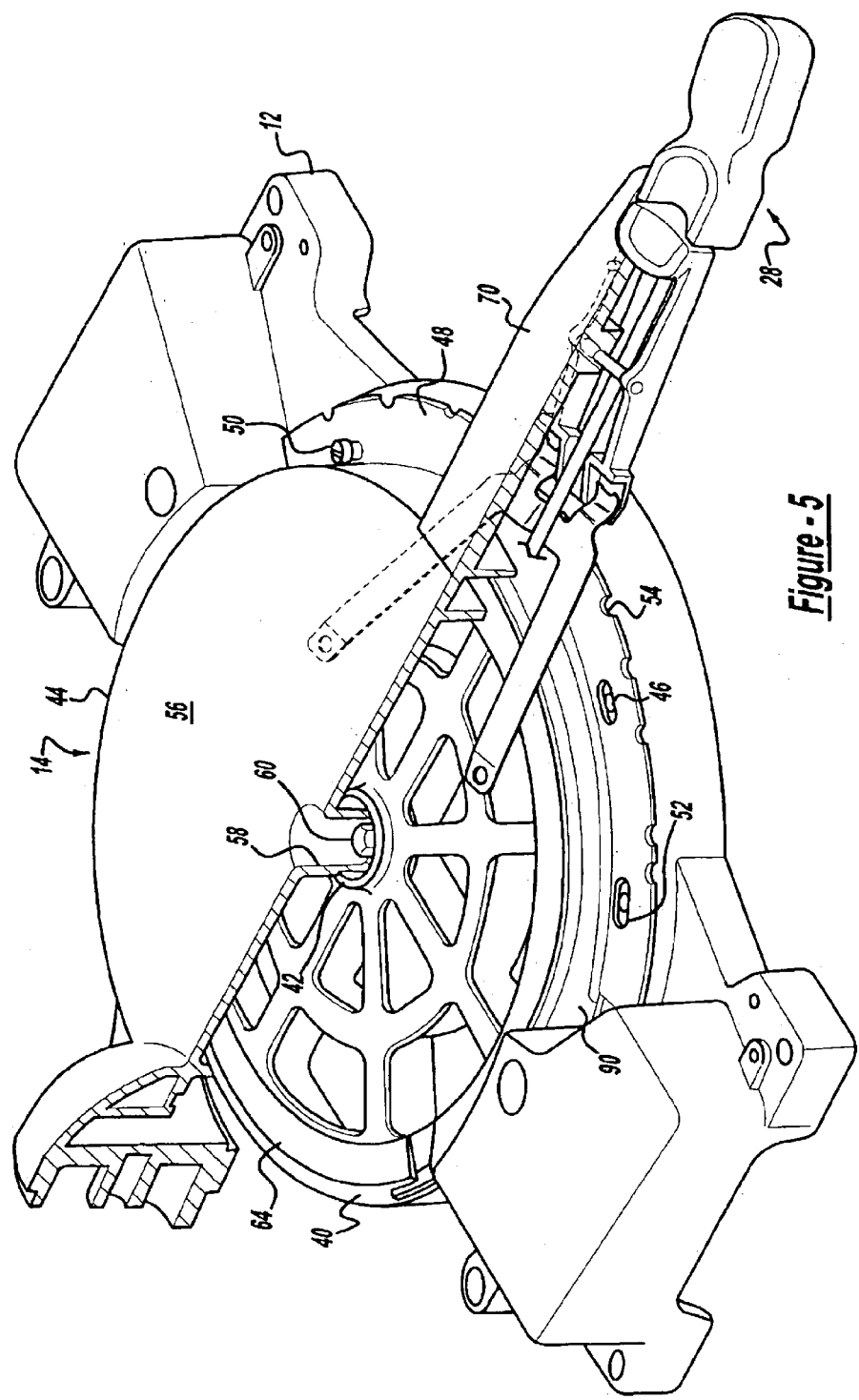
FIG. 5 is an assembled perspective view, partially in cross-section of the table assembly shown in FIGS. 1 through 4.

Referring to FIG. 5, the present invention is directed towards table assembly 14 and locking mechanism 28 which locks table assembly 14 to base assembly 12 at any specified miter angle. Base assembly 12 defines a circular mounting structure 40 which includes a cylindrical cup shaped mounting boss 42 for mounting a table 44 as will be described later herein. Base assembly 12 also defines a plurality of threaded apertures 46 which are used to mount a detent plate 48 using a plurality of bolts 50, only one being shown in FIG. 5. Detent plate 48 defines a plurality of slots 52 which correspond to the plurality of threaded apertures 46 in order to allow for the securing of detent plate 48 to base assembly 12 by bolts 50. The plurality of slots 52 permit adjustment of detent plate 48 to ensure the proper relationship of the pre-specified miter angles. Detent plate 48 further defines a plurality of detent slots 54 which are located at various popular miter angles for saw 10. Detents 54 work in conjunction with locking mechanism 28 to locate table 44 at one of the various popular miter angles as will be described later herein.

Table assembly 14 includes table 44 and locking mechanism 28. Table 44 is a circular plate-like member defining a work supporting surface 56 and a mounting boss 58. Table 44 is rotatably mounted to base assembly 12 by inserting boss 58 of table 44 into boss 42 of base assembly 12. A bolt 60 is inserted through table 44 and threadably received within a threaded bore (not shown) in base assembly 12 to complete the assembly. Bolt 60 is tightened enough to secure table 44 to base assembly 12 but it is not tightened to the point of restricting rotation of table 44 with respect to base assembly 12. The threads on bolt 60 incorporate a patch lock to lock bolt 60 in position once it has been tightened.

Table 44 rotates with respect to base assembly 12 in order to change the miter angle of saw 10. This rotation of table 44 changes the angular relationship of saw blade 18 with respect to fence assembly 26 but does not change the angular relationship of saw blade 18 with respect to table 44. Disposed between table 44 and base assembly 12 are a plurality of wear plates 64. Wear plates 64 provide a surface to support table 44 as well as reducing the friction and wear between table 44 and base assembly 12. Wear plates 64 are preferably manufactured from spring steel and protect base assembly 12 which is preferably manufactured from aluminum from excessive wear that would cause excessive play between base assembly 12 and table 44 leading to cutting inaccuracy.

Figure 6:
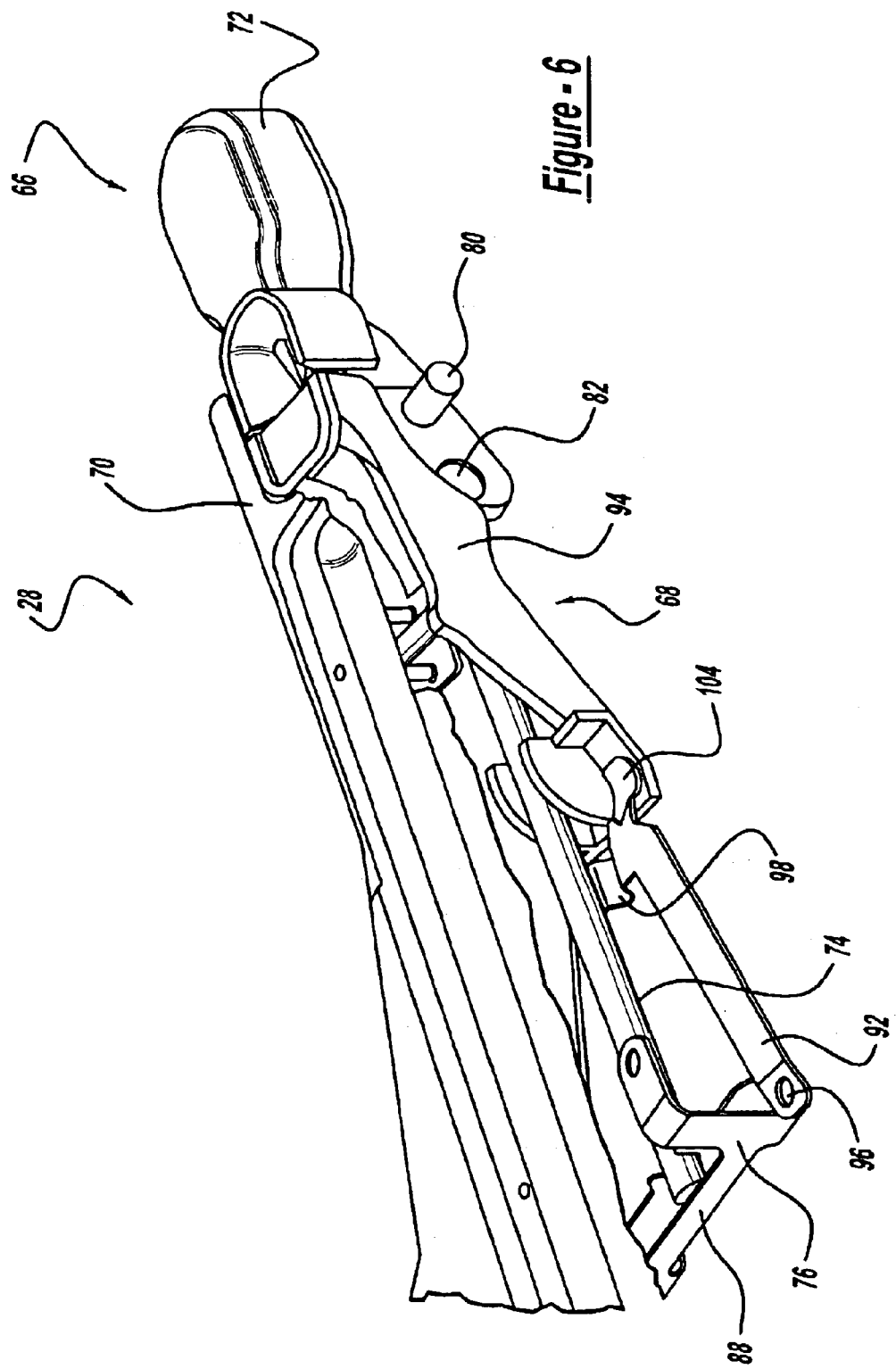
FIG. 6 is a perspective view of the miter locking mechanism and miter detent override mechanism in accordance with the present invention.

Referring now to FIGS. 5 and 6, lock assembly 28 comprises a miter locking mechanism 66, a miter detent override mechanism 68 and a housing 70. Housing 70 is a generally hollow rectangular member which is fixedly secured to table 44 such that it extends radially outward from table 44. Housing 70 is positioned on table 44 such that when saw blade 18 is positioned perpendicular to fence 26, or at a 0° miter angle, housing 70 is also generally perpendicular to fence assembly 26. Thus, housing 70 is generally parallel to saw blade 18.

Figure 7:
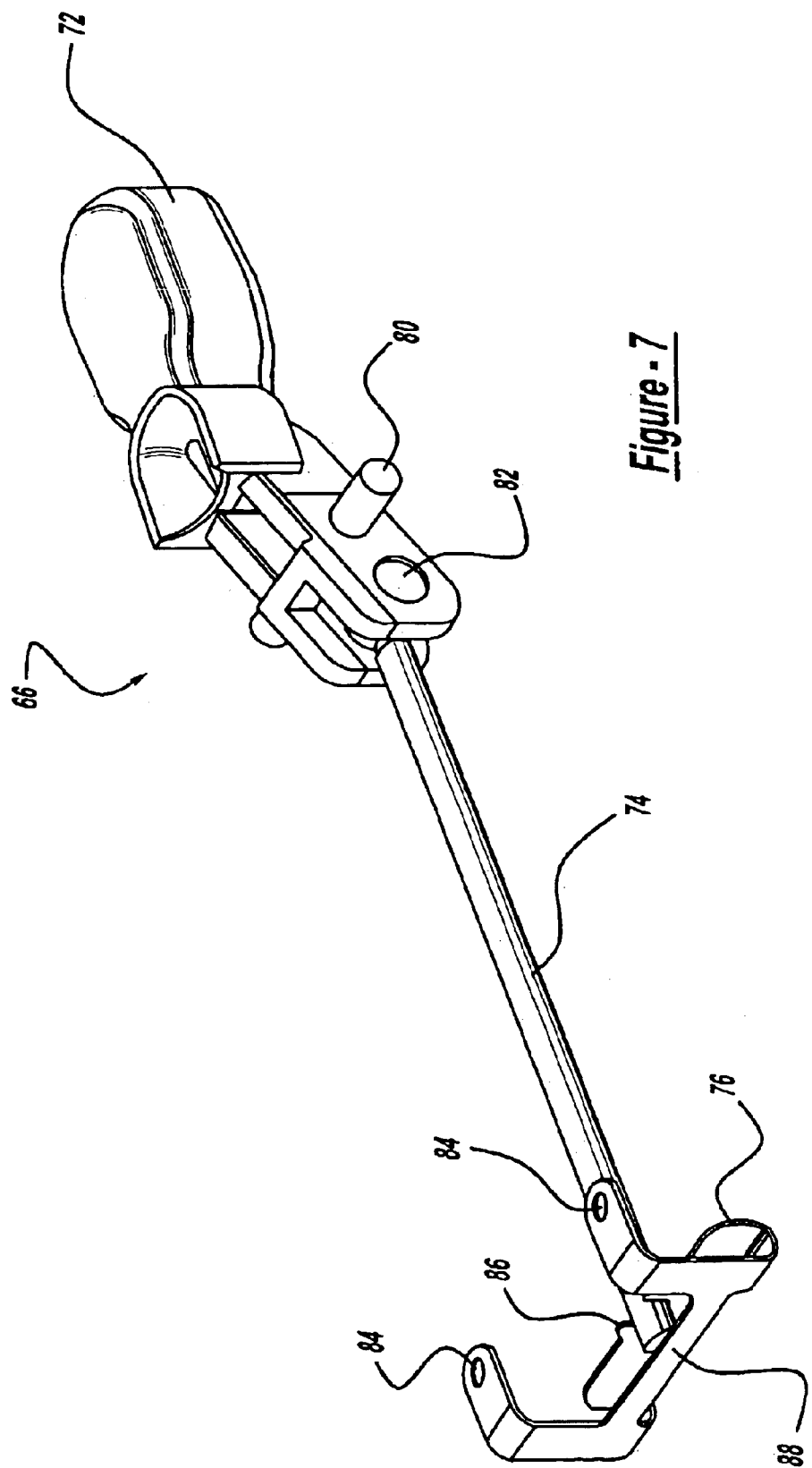
FIG. 7 is a perspective view of the miter locking mechanism shown in FIG. 6.

Referring now to FIGS. 5–7, miter locking mechanism 66 comprises a locking lever 72, a threaded locking rod 74 and a locking bracket 76. Locking lever 72 is pivotably secured to the outer end of housing 70 by a pin 80. The threaded end of locking rod 74 is threadingly received in a pivot pin 82 which is rotatably secured to locking lever 72. Locking bracket 76 is fixedly secured to table 44 by a pair of bolts that extend through a pair of apertures 84 formed into locking bracket 76. Locking bracket 76 defines a slot 86 which slidingly accepts locking rod 74. Locking bracket 76 is a generally U-shaped component with one leg of the U defining slot 86 and the opposite end of the U defining a locking tab 88. When locking bracket 76 is assembled to table 44 and table 44 is assembled to base assembly 12, locking tab 88 is positioned adjacent to a cylindrical surface 90 located on base assembly 12.

Miter locking mechanism 66 can be located in one of two positions by the pivotal movement of lever 72. Referring now to FIG. 9C, miter locking mechanism 66 is shown in its locked position with lever 72 being located at a position angled downwardly from a horizontal position or a position angled downwardly from the upper surface of housing 70. In this position, lever 72 urges locking rod 74 towards table 44 which in turn engages locking tab 88 against surface 90 of base assembly 12 locking table 44 with respect to base assembly 12 at the specifically desired miter angle. The load with which locking rod 74 engages locking tab 88 and surface 90 can be adjusted by rotating locking rod 74 within pivot pin 82 to adjust the working length of locking rod 74. A screw driver slot is provided in the threaded end of locking rod 74 to facilitate this adjustment. A patch lock, or other retaining mechanism, is incorporated onto the threads of locking rod 74 to retain locking rod 74 at its desired location with respect to pivot pin 82.

Figure 9A:
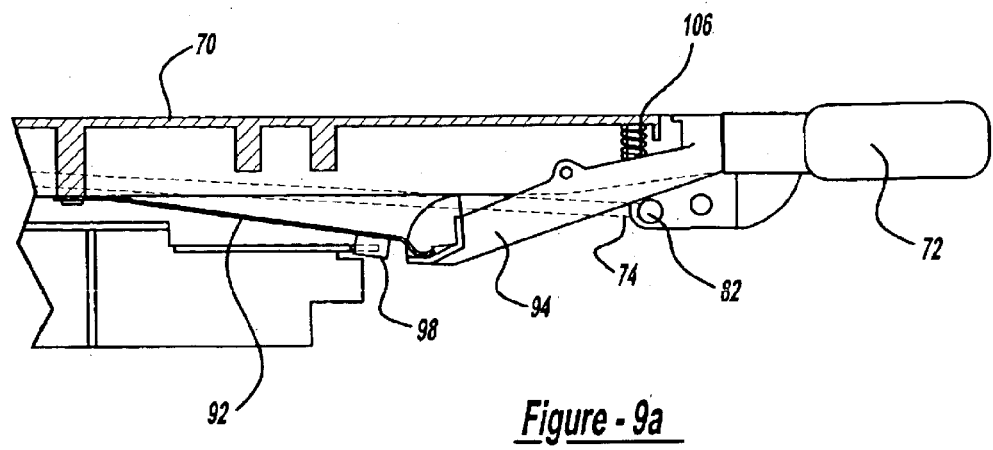
FIGS. 9A–9D are cross-sectional side views of the miter locking mechanism and the miter detent override mechanism in accordance with the present invention showing the mechanisms in their various positions.
Figure 9B:
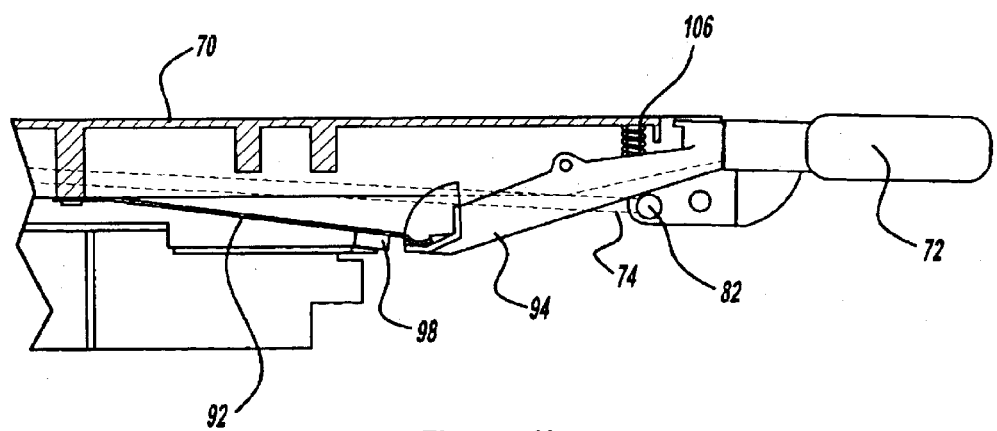
Figure 9C:
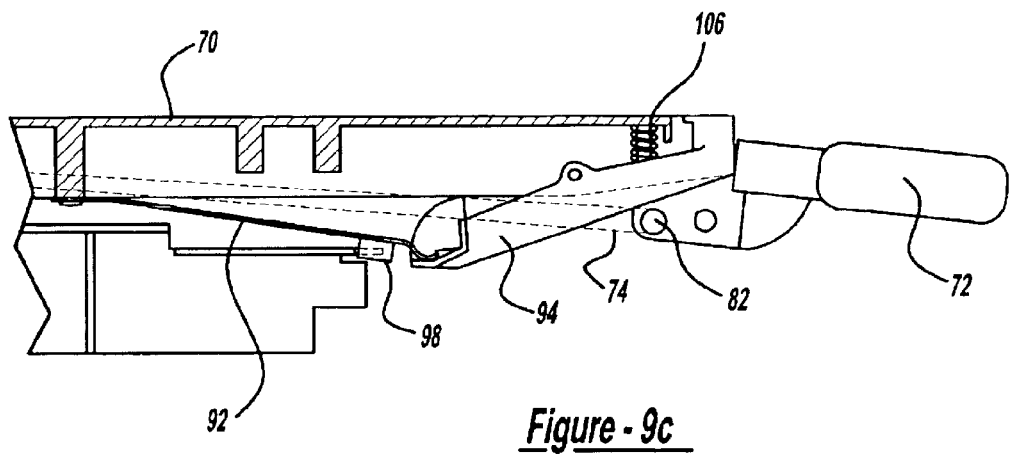
Figure 9D:
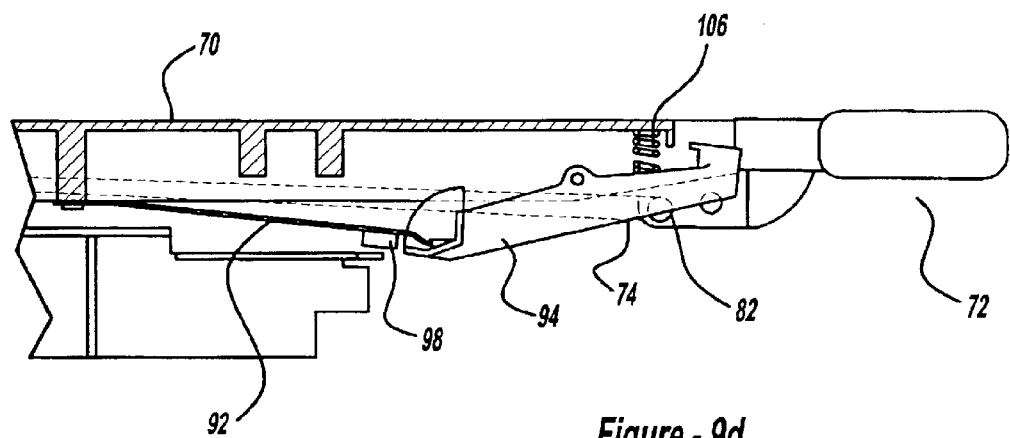

Referring now to FIG. 9D, miter locking mechanism 66 is shown in its released position with lever 72 being located at a generally horizontal position or at a position generally parallel with the upper surface of housing 70. In this position, locking rod 74 is moved away from locking tab 88 and surface 90. Table 44 can now be rotated with respect to base assembly 12 to be located at another desired miter angle.

Figure 8:
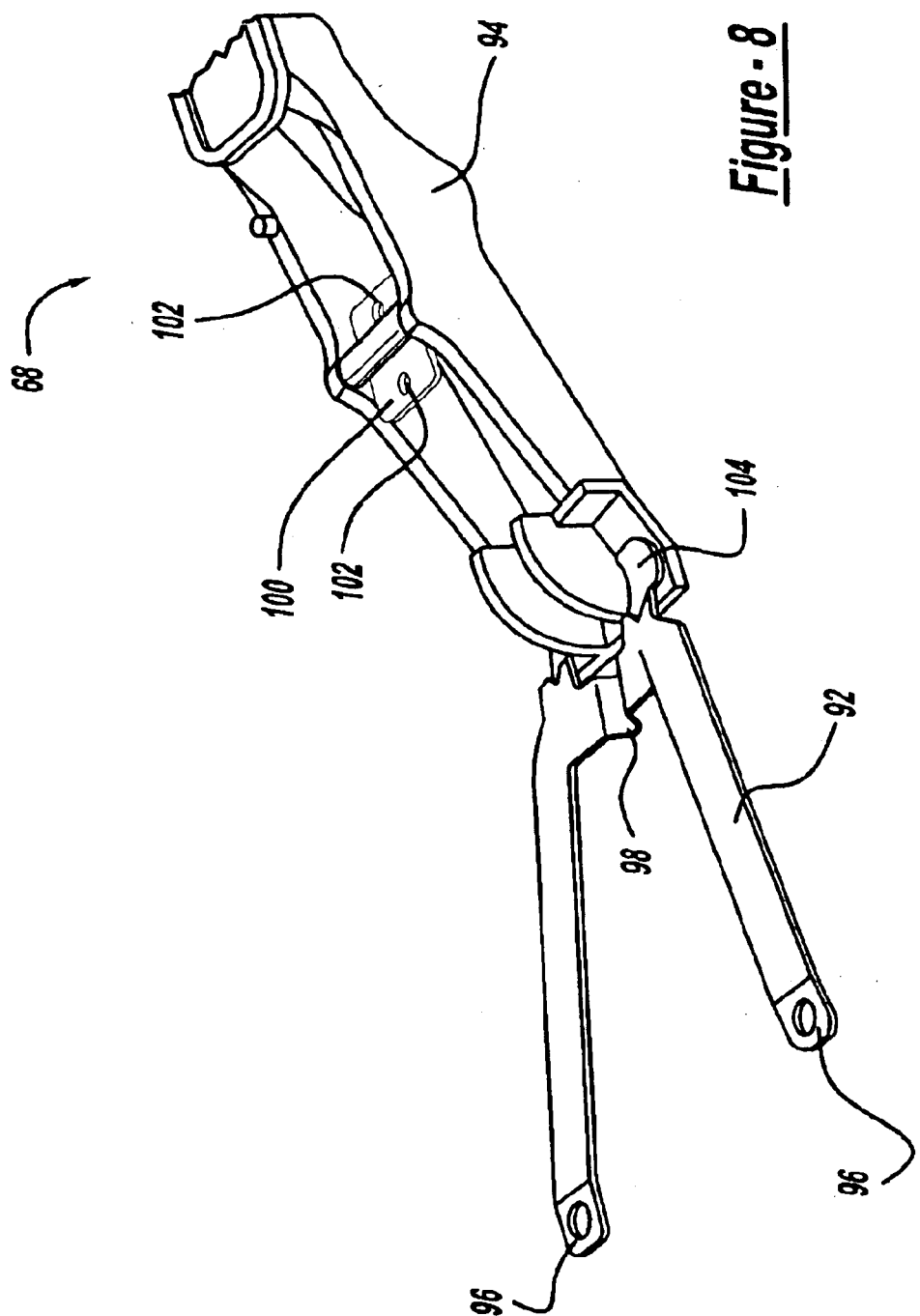
FIG. 8 is a perspective view of the miter detent override mechanism shown in FIG. 6.

Referring now to FIGS. 5, 6 and 8, miter detent override mechanism 68 comprises a detent spring 92 and a detent override lever 94. Detent spring 92 is secured to table 44 using a pair of bolts that extend through apertures 96 formed in detent spring 92. Detent spring 92 is a generally U-shaped spring which includes a formed detent 98 on the connecting leg of the U. Detent spring 92 is normally positioned as shown in FIG. 9A with the shape of detent spring 92 being designed such that detent 98 biased into one of the detent slots 54 to releasably position support table 44 with respect to base assembly 12 at one of the more common miter angles defined by detent slots 54.

Detent override lever 94 is pivotably secured to housing 70 using a clamp pivot 100 which is bolted to housing 70 using a pair of bolts extending through apertures 102 formed in clamp pivot 100. The outer end of lever 94 extends towards locking lever 72 and is positioned between locking lever 72 and housing 70 as shown in FIGS. 5 and 6. The opposite of inner end of lever 94 extends toward detent spring 92. The inner end of lever 94 is positioned under the outer end of detent spring 92 to enable lever 94 to move detent 98 out of engagement with the respective slot 54. Detent spring 92 includes a pair of contoured tabs 104 which are cradled by the inner end of detent override lever 94. A biasing spring 106 biases lever 94 in a clockwise direction, as shown in FIGS. 9A–9C, such that the inner end of lever 94 maintains engagement with contoured tabs 104.

Detent override lever 94 is normally positioned as shown in FIG. 9A. In this position, detent 98 is in engagement with one of the slots 54 to releasably hold table 44 at one of the more popular miter angles. When it is desired to reset support table 44 to a new miter angle, locking lever 72 of miter locking mechanism 66 is first moved to its released position as shown in FIG. 9D and the outer end of lever 94 is pushed downward to pivot lever 94 in a clockwise direction as shown in FIG. 9D. Support table 44 can now be rotated until the desired miter angle is reached. At this point, detent override lever 94 can be released causing detent 98 to engage another detent slot 54 if it is desired to select one of the more popular miter angles defined by detent slots 54. Locking lever 72 of miter locking mechanism 66 is then moved to its locked position as shown in FIG. 9C to secure table 44 with respect to base assembly 12.

When the desired miter angle is not one of the pre-selected miter angles defined by slots 54, the adjustment of table 44 is similar but different to that described above. With table 44 locked to base assembly 12 as shown in FIG. 9C, when it is desired to reset support table 44 to a new miter angle, locking lever 72 of miter locking mechanism 66 is first moved to its released position as shown in FIG. 9A or 9B and the outer end of lever 94 is pushed downward to pivot lever 94 in a clockwise direction as shown in FIG. 9D. This clockwise rotation of lever 94 causes the inner end of lever 94 to lift detent spring 92 causing the disengagement of detent 98 with its respective slot as shown in FIG. 9D. When the desired miter angle is reached, locking lever 72 of miter locking mechanism 66 is moved to its locked position as shown in FIG. 9C to secure table 44 with respect to base assembly 12. Once locking lever 72 has been locked, lever 94 can be released. The release of lever 94 allows detent spring 92 to engage the upper surface of detent plate 48 as shown in FIG. 9B because detent 98 is not aligned with one of slots 54. By keeping pressure on miter detent override lever 94 while engaging locking lever 72, detent 98 is kept away from detent plate 48 and slots 54. This allows the setting of a miter angle near one of the slots 54 (i.e., 44° instead of 45°) without having the biasing load of detent spring 92 reacting against detent plate 48 to urge table 44 to the desired angle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A miter saw comprising:
   a base;
   a table rotatably secured to said base;
   a detent system including:
   a detent lever attached to a first component of said miter saw and operable to pivot with respect to said table at a first position defining a first pivot axis;
   a detent spring fixedly secured to said table, said detent spring being biased toward a detent plate, said detent spring engaging at least one detent slot to releasable hold said table with respect to said base, said detent lever engaging said detent spring;
   a locking mechanism separate from and parallel to said detent system, said locking mechanism including:
   a lever attached to a second component of said miter saw and operable to pivot with respect to said table at a second position to define a second pivot axis and to move said locking mechanism between a locked and an unlocked position, said second position being spaced from said first position, said second pivot axis being generally parallel to said first pivot axis;
   a locking bracket fixedly secured to said table and movable between a released and a retained position;
   a locking rod disposed between said locking lever and said locking bracket, said locking rod moving said locking bracket to said retained position when said locking lever is pivoted to said locked position.

2. The miter saw according to claim 1, wherein said detent lever moves said detent spring away from said detent plate.

3. The miter saw according to claim 2, wherein said detent lever is biased away from said detent spring.

4. The miter saw according to claim 2, wherein said detent lever is disposed adjacent said locking lever.

5. The miter saw according to claim wherein 2, said locking rod is parallel to said detent lever.

6. The miter saw according to claim 5, wherein said locking rod is adjacent said detent lever.

7. A miter saw comprising:
   a base;
   a table rotatably secured to said base;
   a detent system including a detent lever attached to a first component of said miter saw and operable to pivot with respect to said table at a first pivot position, defining a first pivot axis, said detent lever being movable between a first detent lever position where said table is releasably held with respect to said base by said detent system and a second detent lever position where said table is free to rotate relative to said base;
   a locking mechanism including a locking lever attached to a first component of said miter saw and operable to pivot with respect to said table at a second pivot position defining a second pivot axis, said second pivot axis being generally parallel to said first pivot axis, said second pivot position being spaced from said first pivot position, said locking lever movable between a first locking lever position where said table is locked to said base by said locking mechanism and a second locking lever position where said table is free to rotate relative to said base.

8. The miter saw according to claim 7, wherein said detent system is biased into said first detent lever position.

9. The miter saw according to claim 7, wherein said locking mechanism comprises:

a locking bracket fixed to said table and movable between a released position and a locked position; and a locking rod disposed between said locking lever and said locking bracket, said locking lever and said locking rod being operable to move said locking bracket between said released and said locked positions.

10. The miter saw according to claim 9, wherein said detent system further comprises:

a detent plate fixedly secured to one of said table and said base, said detent plate defining at least one detent slot; and a detent spring fixedly secured to the other of said table and said base, said detent spring being biased toward said detent plate, said detent spring defining a detent adapted to engage said at least one detent slot.

11. The miter saw according to claim 10, wherein said detent lever moves said detent spring away from said detent plate.

12. The miter saw according to claim 11, wherein said detent lever is adjacent said locking lever.

13. The miter saw according to claim 7, wherein said locking mechanism comprises:

a locking bracket fixedly secured to said table and movable between a released position and a locked position; and a locking rod disposed between said locking lever and said locking bracket, said locking lever and said locking rod being operable to move said locking bracket between said released and said locked positions; and said detent system further comprises:

a detent plate fixedly secured to one of said table and said base, said detent plate defining at least one detent slot; and a detent spring fixedly secured to the other of said table and said base, said detent spring being biased against said detent plate.

14. The miter saw according to claim 13, wherein said detent lever is operable to move said detent spring away from said detent plate.

15. The miter saw according to claim 13, wherein said detent lever is adjacent said locking lever.

\* \* \* \* \*

UNITED STATES PATENT AND TRADEMARK OFFICE
CERTIFICATE OF CORRECTION

PATENT NO. : 6,810,780 B2  
APPLICATION NO. : 09/852475  
DATED : November 2, 2004  
INVENTOR(S) : Warren A. Ceroll et al.

Page 1 of 1

It is certified that error appears in the above-identified patent and that said Letters Patent is hereby corrected as shown below:

<u>Title Page,</u>  
Item [75], Inventors, "Thomas R. Kaye" should be -- Thomas R. Kaye, Jr. --.

<u>Column 6,</u>  
Line 17, "releasable" should be -- releasably --.  
Line 41, "claim wherein 2" should be -- claim 2 wherein --.  
Line 51, delete ",".

Signed and Sealed this

Eighth Day of January, 2008

JON W. DUDAS  
*Director of the United States Patent and Trademark Office*